United States Patent [19]
Ruppel, Jr.

[11] Patent Number: 6,066,216
[45] Date of Patent: *May 23, 2000

[54] MESA FORMING WELD DEPTH LIMITATION FEATURE FOR USE WITH ENERGY DIRECTOR IN ULTRASONIC WELDING

[75] Inventor: Edward F. Ruppel, Jr., San Jose, Calif.

[73] Assignee: Biometric Imaging, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/245,447

[22] Filed: Feb. 5, 1999

[51] Int. Cl.[7] .............................. B32B 31/20; B32B 31/16
[52] U.S. Cl. .................... 156/73.1; 403/270; 156/580.1; 156/580.2
[58] Field of Search .............................. 156/580.2, 580.1, 156/73.1; 264/445, 443, 442; 403/270

[56] References Cited

U.S. PATENT DOCUMENTS

| | | | |
|---|---|---|---|
| 5,360,499 | 11/1994 | Savovic | 156/73.1 |
| 5,401,342 | 3/1995 | Vincent et al. | 156/73.1 |
| 5,520,775 | 5/1996 | Fischl et al. | 156/580.1 |
| 5,540,808 | 7/1996 | Vincent et al. | 156/580.2 |
| 5,782,575 | 7/1998 | Vincent et al. | 403/270 |

*Primary Examiner*—Richard Crispino
*Assistant Examiner*—George R. Koch, III
*Attorney, Agent, or Firm*—Thomas Schneck; David M. Schneck

[57] ABSTRACT

An energy director structure with an auxiliary weld depth limitation feature is provided. The energy director is located on a first contact shelf. A second contact shelf that is shorter, broader, forming a mesa is positioned laterally adjacent to, and below, the first contact shelf. The second contact shelf forms a mesa that limits the depth of the ultrasonic welding. Limiting the time, pressure, or temperature of the welding process additionally ensures the weld depth is limited to the height of the second contact shelf or mesa. Two plastic pieces, one of which includes an energy director and mesa structure, may be welded together to form a capillary having precise volumetric accuracy.

14 Claims, 5 Drawing Sheets

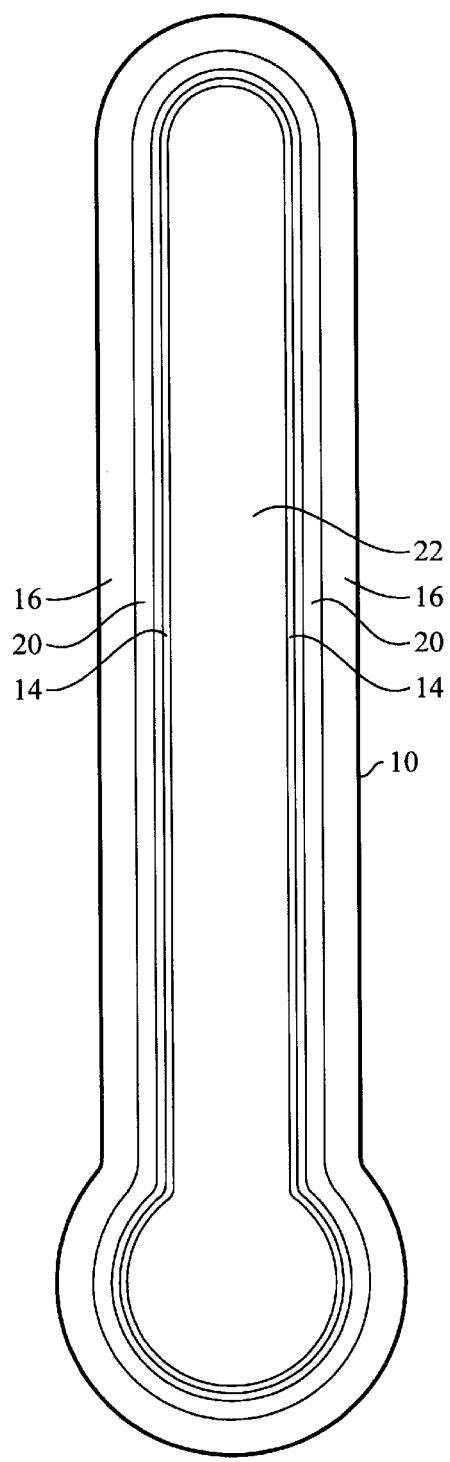 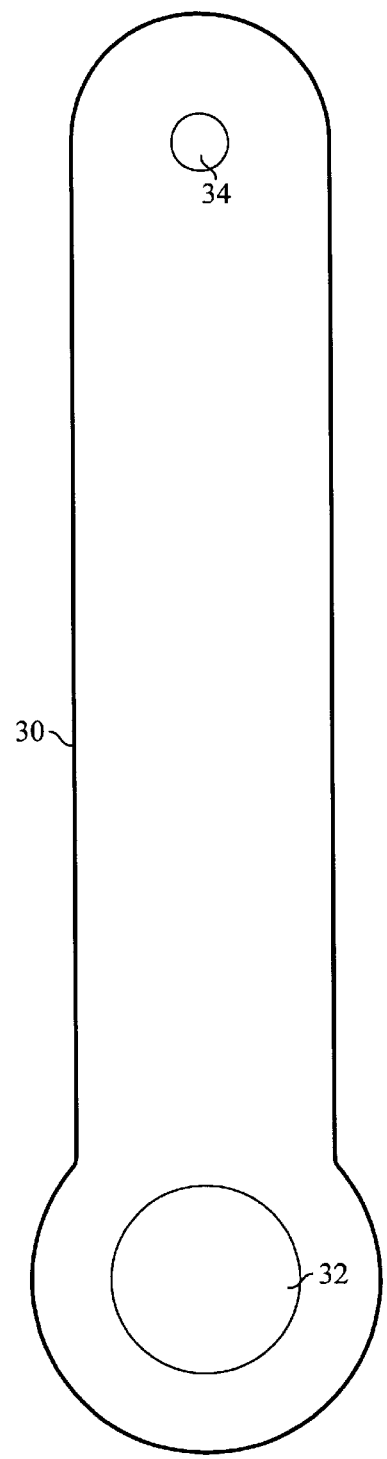
*Fig. 3*  *Fig. 4*

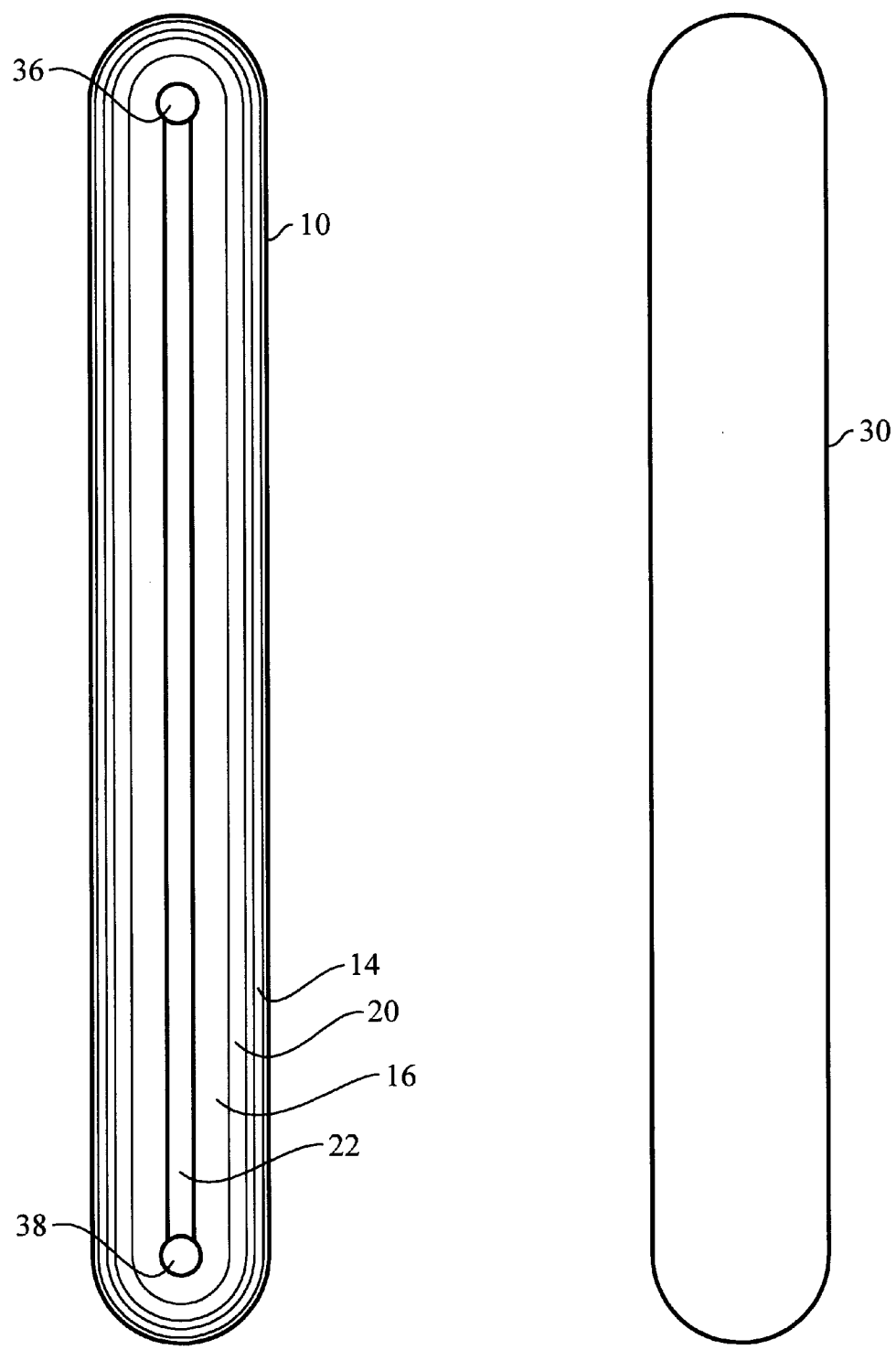
*Fig. 7*   *Fig. 8*

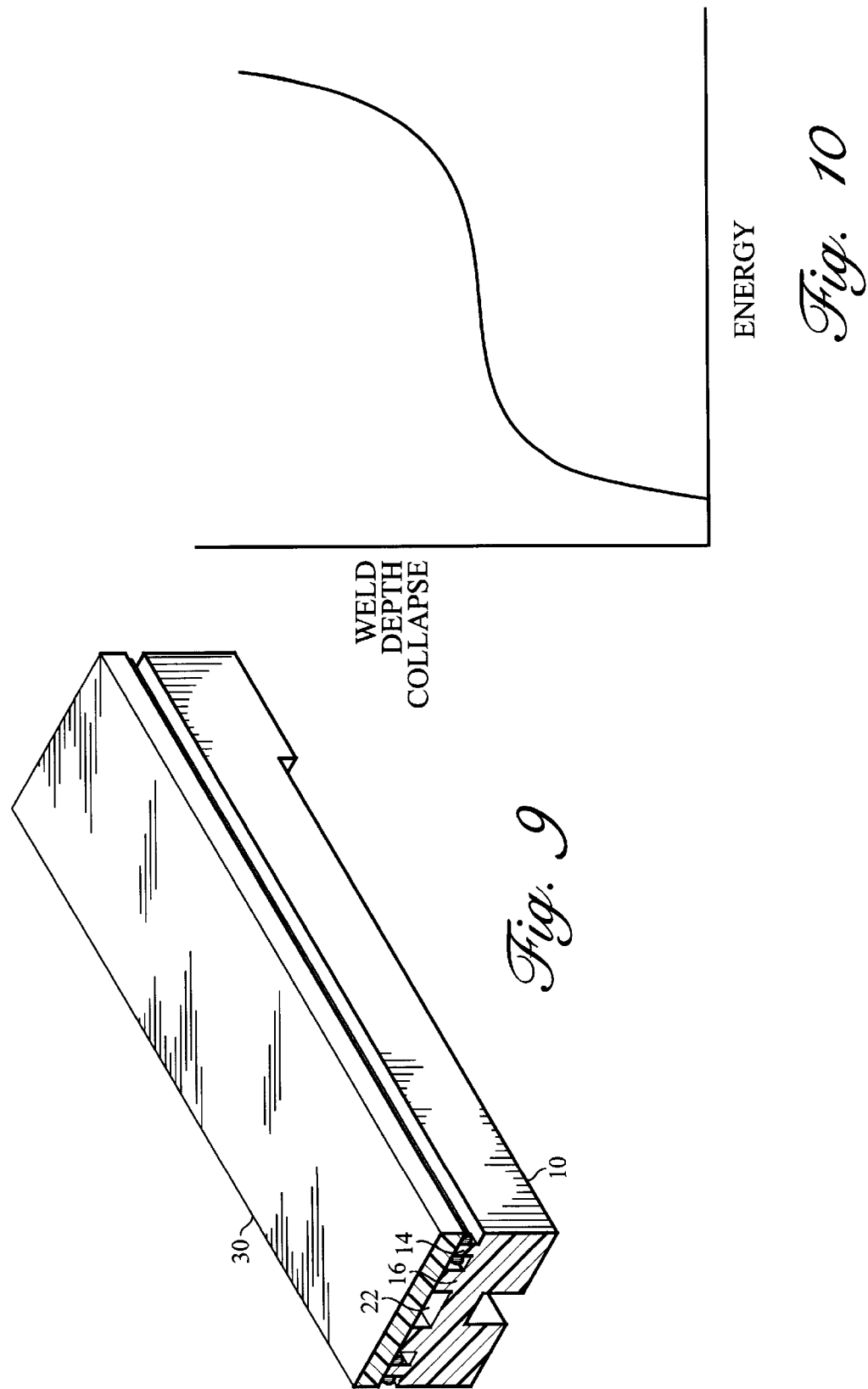

MESA FORMING WELD DEPTH LIMITATION FEATURE FOR USE WITH ENERGY DIRECTOR IN ULTRASONIC WELDING

TECHNICAL FIELD

This invention relates generally to ultrasonic welding and more specifically to energy director structures used with ultrasonic welding for making miniature structures, such as capillaries.

BACKGROUND ART

Currently there is a need for precise attachments of miniature light-weight plastic pieces to each other. For example, in the emerging field of microfluidics, particularly in labware, connecting channels and reservoirs are used for effecting chemical reactions and assays on a scale involving microliters of fluids. Microfluidic devices allow for self-contained reactions within a single, light-weight reaction container. Advantages of this system include an ability to perform microscale assays and reactions, saving material costs, and the development of self-contained systems that minimize exposure to potentially hazardous materials. To effect this technology requires precise and reliable attachment of plastic parts. Manufacturing such parts necessitates precise attachment of small plastic pieces.

One method used to attach together plastic pieces is ultrasonic welding. As with adhesives, ultrasonic welding enables formation of a strong, hermetic seal along the length of a weld seam. However with ultrasonic welding, unlike with adhesives, plastic pieces can be attached together without the problems stemming from drying adhesives, such as outgassing or bleeding. In ultrasonic welding an "energy director" on a plastic piece is used to focus the weld energy. The energy director is a protrusion or bead which runs along the length of a seam to be ultrasonically welded, causing localized melting of the energy director. Since the energy director is usually a solid, ultrasonically conductive polymer, typically a thermoplastic material, such as acrylic, it melts when ultrasonic energy is applied and the melted plastic protrusion bonds to an abutting second plastic piece which partially melts. U.S. Pat. Nos. 5,401,342 and 5,540,808 to Vincent et al. teach the use of two angled ridges as energy directors. The shape of the energy director promotes thermoplastic flow as two plastic pieces are attached together.

U.S. Pat. No. 5,782,575 to Vincent et al. teaches that an energy director may have first and second parallel ridges, with a groove therebetween. A ledge adjacent one of the ridges is provided. The ledge is included, despite its tendency to cause undesirable flashing, to help stop the welding before the plastic parts melt through.

Currently by using a standard angled energy director, the energy from an ultrasonic welding horn focuses energy on a small area causing heating and melting of thermoplastic ridges, beads or protrusions. It is difficult to stop this process at a precise depth. This precludes the ability to use ultrasonic welding for attachment of plastic pieces at an exact height, as would be needed to attach two plastic pieces together to form an interior cavity of precise dimensions. Using standard technology limitation of weld depth can be effected by limiting the amount of welding energy or mechanical limitations. This results in weld depth precision of plus or minus 10 microns. This tolerance is too inaccurate for the formation of interior cavities with precise dimensions.

The object of this invention is to provide a simple method to more accurately control ultrasonic weld depth.

SUMMARY OF THE INVENTION

The objective is achieved by providing a first thermoplastic piece for ultrasonic welding to a second plastic piece that has two parallel, slightly spaced apart, contact shelves. The present invention features a first contact shelf having an angled energy director and a second contact shelf that is a mesa which is shorter in height than the first contact shelf and has a median width at least equal to the median width of the first contact shelf. The second contact shelf does not function as an energy director because of this geometry. When ultrasonic energy is applied to the first plastic piece, the energy director forming the first contact shelf will melt. Greater energy would be required to melt the second contact shelf, which is wider than the first contact shelf and lacks an energy director to localize the weld energy. Because the second contact shelf does not appreciably melt, the weld depth would be limited to the height of the second contact shelf. Extending between the two contact shelves is a groove. Unlike the prior art, melted material from the energy director flows into the groove and not onto the mesa of the second contact shelf. This will prevent the melted material from affecting the weld depth. In one embodiment of the invention, two sets of contact shelves are provided on the first plastic piece. When a second plastic piece is attached to the first plastic piece, the weld depth will be limited to the height of the second contact shelf that lacks the energy director. In this manner, miniature structures such as capillaries may be fabricated with the resulting structure having volumetric precision.

In this patent application, the term "plastic" is to be understood to mean thermoplastics which may be used in ultrasonic welding.

BRIEF DESCRIPTION OF THE DRAWINGS

FIG. 3 shows a top view of a plastic piece defining a portion of a capillary incorporating the mesa weld depth limitation feature of FIG. 1.

FIG. 4 shows a top view of a capillary plastic piece to be welded onto the capillary plastic piece of FIG. 3.

FIG. 7 shows a top view of the plastic piece shown in FIG. 5.

FIG. 8 shows a top view of the top plastic piece shown in FIG. 6.

FIG. 9 shows a perspective view of the welded plastic pieces shown in FIG. 6.

FIG. 10 depicts a graph of the weld seam collapse of the weld using the present invention so embodied in FIG. 1 as weld energy is applied.

BEST MODE OF CARRYING OUT THE INVENTION

Figure 1:
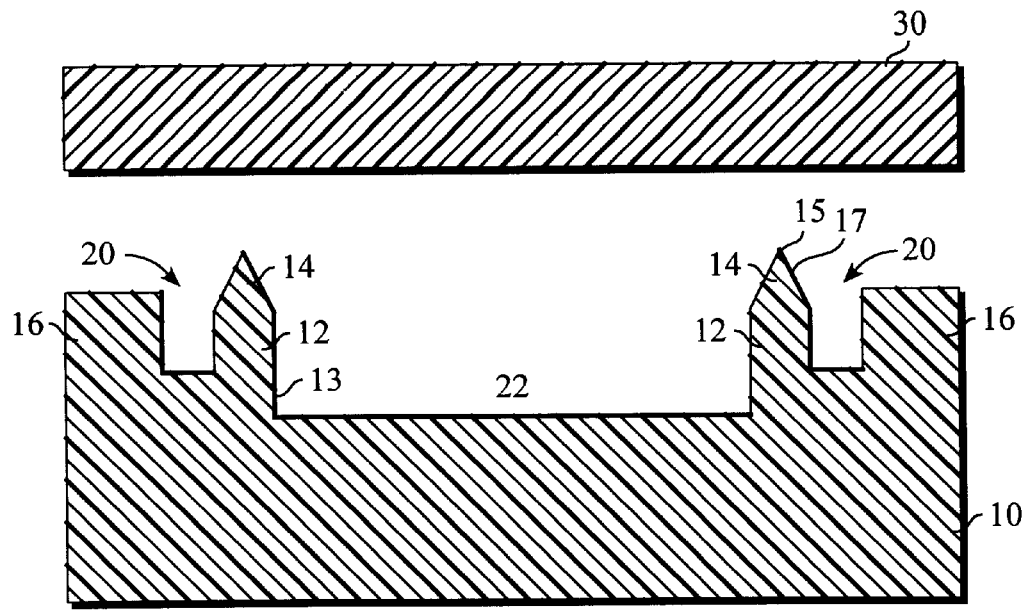
FIG. 1 depicts a cross section of two plastic pieces with one of the plastic pieces having a mesa weld depth limitation feature.

In reference to FIG. 1, a cross section of first thermoplastic piece 10 shows that this piece has two contact shelves 12, 16 symmetrically located on the edge of one side of first thermoplastic piece 10. The two contact shelves 12, 16 are an integral part of first thermoplastic piece 10. Contact shelves 12, 16 are molded onto one side of the first thermoplastic piece 10. The first contact shelf 12 is positioned at the edge of thermoplastic piece 10. On the top of first contact shelf 12 is energy director 14. Energy director 14 is comprised of two angled surfaces 15, 17 that extend toward each other meeting at an angle. Because surfaces 15, 17 angle toward each other the width of contact shelf 12 narrows along part of the height of first contact shelf 12.

Positioned substantially parallel to first contact shelf 12 is second contact shelf 16. Contact shelf 16 does not narrow in width and thus it forms a mesa. It is not designed to focus the ultrasonic welding energy and melt. In addition second contact shelf 16 is at least as wide as first contact shelf 12 if the widths are measured before the break angle of surfaces 15, 17. As the width of contact shelf 16 increases, the shelf demonstrates greater resistance to melting. In one embodiment the second contact shelf 16 is at least twice as wide as first contact shelf 12. To effect melting of second contact shelf 16 requires greater input of energy, pressure, or time of welding. By limiting the energy, pressure or time of welding the amount of melting of second contact shelf 16 can be minimized.

FIG. 10 illustrates the collapse of the weld depth as additional ultrasonic weld energy is applied to a weld seam of the present invention. Initially as energy is applied the weld seam collapses as the energy melts the energy director. Stopping the weld collapse at this point through external mechanical means would be inherently inaccurate. The plateau seen in the collapse occurs once the collapse of the weld depth reaches the second contact shelf. At this plateau virtually no further collapse occurs until significant additional energy input. This allows for precise limitation of the weld depth collapse by limitation of energy, time, and pressure of the weld during this collapse plateau. The weld depth is thus limited to the height of second contact shelf since second contact shelf 16 will not appreciably melt. In contrast first contact shelf 12 readily melts when a welding horn applies ultrasonic energy. This allows the weld tolerances to be held to plus or minus 3 microns in depth. Optimally, the break angle of surfaces 15, 17 is at or below the height of second contact shelf 16 with energy director 14 extending above the height of contact shelf 16. This placement of the break angle allows melting to preferentially take place at the tip of energy director 14 but stop at or slightly before reaching the broadest base portion of first contact shelf 12.

Positioned between first contact shelf 12 and second contact shelf 16 is groove 20. Groove 20 extends between the two contacts shelves 12, 16 along a length of plastic piece 10. When ultrasonic energy is applied to melt energy director 14, the thermoplastic material comprising energy director 14 is melted and bonds with top plastic piece 30. If the melted energy director 14 were to flow onto the top of second contact shelf 16 the precision of the weld depth would decrease as the additional plastic material added thickness to second contact shelf 16. This is prevented by groove 20 which is wide enough to contain the melted thermoplastic material from energy director 14.

Top plastic piece 30 is flat. A length on the edge of the bottom of top plastic piece 30 conforms to the shape of the mesa of second contact shelf 16 and is sufficiently wide to span from the outer edge of interior cavity 22 across substantially all of the mesa of second contact shelf 16. When ultrasonic weld energy is applied to energy director 14, both energy director 14 and the opposing side of top plastic piece 30 will melt such that the pieces are bonded together. As the energy director melts, opposing surfaces on the top plastic piece 30 and bottom plastic piece 10 will move toward each other. The mesa of contact shelf 16 limits this movement. The conforming surface of top plastic piece 30 ensures an accurate depth limit, a sufficient area of bonded surface and uniform bonded seam.

Energy director 14 can be shaped to promote the flow of material into the groove 20. This can be achieved by molding surface 17 and surface 15 such that surface 17 rises at a steep break angle and surface 15 has a less steep angle. By having the energy director surface 15 facing away from the groove 20 angle towards groove 20 promotes the flow of thermoplastic material into groove 20.

The two contact shelves 12, 16 and the groove 20 are positioned on one side of a thermoplastic piece along the edge of that piece. The contact shelves form a continuous feature along the edge of the plastic piece. Thus the piece in cross section would have two pairs of the contact shelves, one set of two contact shelves on each of the two opposing edges of one side of a plastic piece. Preferably the bottom plastic piece is of uniform thickness. This allows the broader outer contact shelf to be of equal height on the two opposing edges. The outer contact shelf controls the weld depth for the attachment of the top piece.

Figure 2:
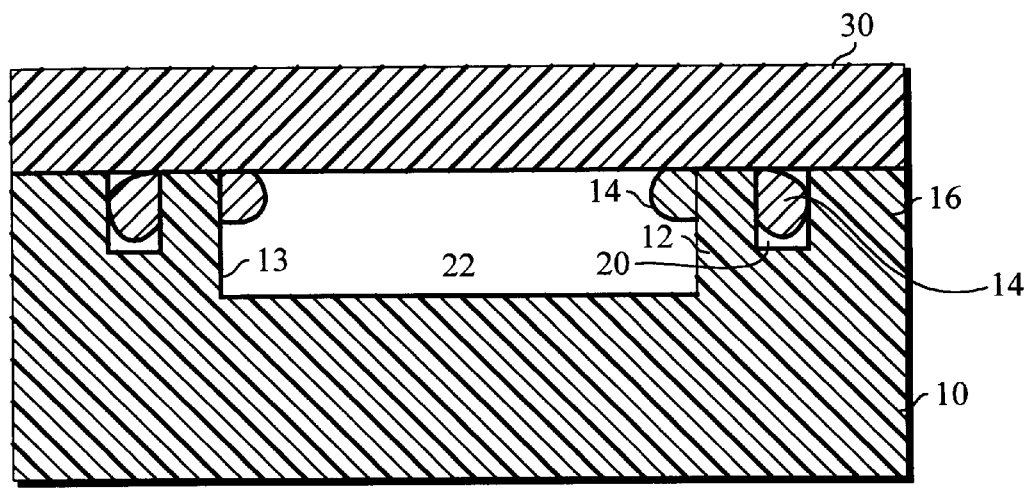
FIG. 2 shows a cross section of the two plastic pieces of FIG. 1 after being welded together.

FIG. 2 illustrates the two thermoplastic pieces 10, 30 after they have been ultrasonically welded together. Energy director 14 has melted and deformed into groove 20. Top thermoplastic piece 30 has been bonded onto bottom thermoplastic piece 10. The weld depth of the ultrasonic weld attaching top plastic piece 30 to bottom piece 10 is the height of second contact shelf 16. First contact shelf 12 has a wall 13 facing away from the edge and toward the center of the side of bottom thermoplastic piece 10. The height of this wall is limited to the weld depth and thus will be as high as second contact shelf 16. An interior cavity 22 is formed by top plastic piece 30 and wall 13. The height of interior cavity 22 is limited to the height of second contact shelf 16. The width of interior cavity 22 is the distance between wall 13 on one edge of bottom plastic piece 10 and wall 13 on the other edge of bottom plastic piece 10. Because second contact shelf 16 does not appreciably melt, the height of interior cavity can be precisely controlled, allowing for greater precision in the volume and dimensions of interior cavity 22.

FIGS. 3 and 4 show the top views of bottom piece 10 and top piece 30 respectively. Both pieces when welded together form a capillary. In FIG. 3 the bottom piece 10 has second contact shelf 16 extending around its edge. Second contact shelf 16 extends continuously along the edge of one side of bottom piece 10 such that in a cross section taken across the length of bottom piece 10, second contact shelf 16 would be positioned on two opposing edges on one side of the bottom piece 10. Positioned parallel and immediately interior to second contact shelf 16 is groove 20. Positioned parallel to and immediately interior to groove 20 is first contact shelf 12. Between the opposing inner sides of first contact shelf 12 is interior cavity 22. The depth of interior cavity is the height of second contact shelf 16 and the height of first contact shelf 12 above the side of bottom piece 10.

The welded plastic pieces illustrated in FIGS. 3 and 4 form a unitary capillary for optical assay of fluorescent targets. As such the material used in constructing the plastic pieces is selected for superior optical properties. The bottom piece 10 of FIG. 3 is molded from Lexan 121-112, a polycarbonate resin produced by General Electric. The bottom piece must not transmit or fluoresce light. This allows assays that require fluorescence detection within a capillary. To achieve this feature, the bottom is colored black by addition of 1% by weight of UN0055P Omni black produced by Reid Spectrum of. The top material is selected for superior optical properties that allow fluorescent interrogation of the sample contained within the capillary. The top piece 30 of FIG. 4 is molded from Lexan 131-111N polycarbonate resin. Lexan has good transparency (92%) and a refractive index of 1.58. Determining the thickness of material to be used requires balancing the lower autofluorescence and dye cutting advantages of a thinner layer with the mechanical strength provided by a thicker layer. The present capillary uses material of 175–500 thousandths of an inch thick. Although Lexan is the material presently used, it is contemplated that the present invention is adaptable any material that is capable of being melted by ultrasonic welding.

Top piece 30 is shaped to conform to the dimensions of the top side of bottom piece 10. Top piece 30 is molded having two holes that extend through the plastic piece. A first hole 32 allows disposition of a sample through the top piece and onto piece 10. Capillary action then draws the sample into the narrower interior cavity 22. Second hole 34 allows air to escape as interior cavity 22 fills with the sample.

To effect ultrasonic welding, first top thermoplastic piece is placed into an ultrasonic welding mold. To prevent damaging of the surface of top piece 30 during the welding the release liner used with the top thermoplastic piece is left in place. This protects the top piece from contact with the mold that could cause surface imperfections. The bottom piece 10 is then placed against top piece 30 such that energy director 14 is in contact with the surface of top piece 30. The ultrasonic welding horn is then placed against the other side of bottom piece 10. An energy director 7 thousandths of an inch high, 5 thousandths of an inch wide with a break angle of 45° comprised of the materials described will begin to melt after 20 joules of energy have been applied at under 35 kHz, 20 lbs. pressure and will be finished welding once 40 joules of energy have been applied under these same conditions. At this level of power there will be only minimal melting of the second shelf.

Figure 5:
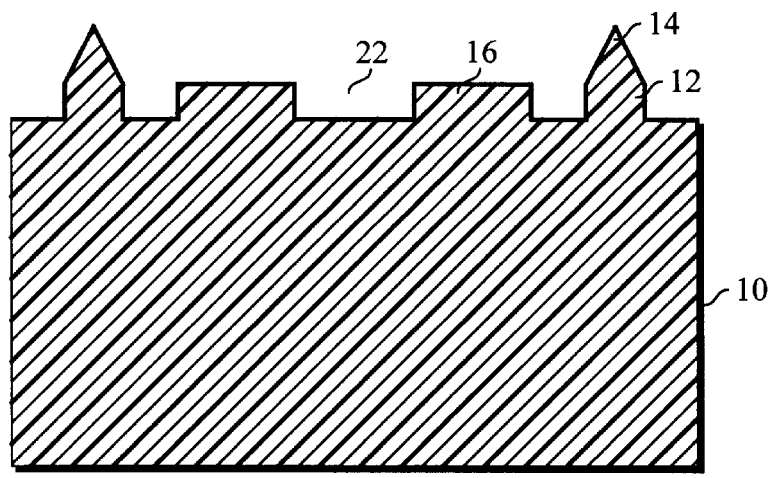
FIG. 5 depicts a cross section of an alternative embodiment of the positioning of the mesa weld depth limitation feature.
Figure 6:
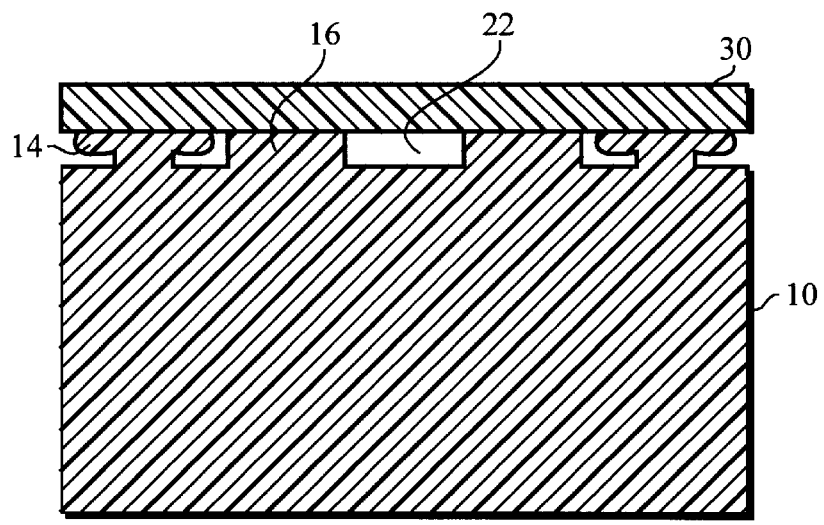
FIG. 6 shows a cross section of the plastic piece of FIG. 5 welded to a top plastic piece.

FIG. 5 shows a cross section of an alternate embodiment of the present invention. Here the first contact shelf 12 containing energy director 14 is positioned on the edge of plastic piece 10 to the outside of second contact shelf 16. Here, second contact shelf 16 is more than twice as wide as first contact shelf 12, allowing greater precision of weld depth control. FIG. 6 illustrates the cross section of FIG. 5 after top plastic piece 30 has been welded to bottom plastic piece 10. In this embodiment, energy director 14 has melted into groove 20. The weld depth is again limited to the height of the broad mesa of second contact shelf 16. In this embodiment, because second contact shelf 16 is positioned interior along the edge of plastic piece 10 of first contact shelf 12 the melted material from energy director 14 will not flow into interior cavity 22. This enhances the precision of the volume of interior cavity 22.

A top view of bottom piece 10 seen in FIG. 7 shows the contact shelf orientation described. Energy director 14 extends in a circuit around the edge of the top side of bottom piece 10. Interior and substantially parallel to the energy director 14 along the top side of bottom piece 10 is groove 20. Interior to groove 20 is second contact shelf 16 which also extends along the periphery of bottom piece 10 substantially parallel to energy director 14. Bottom piece 10 has been molded with holes 36 and 38 that extend through the plastic piece. Once the top piece 30 is welded onto bottom piece 10, the holes can be used for introduction of the sample and for venting of the displaced air from the interior cavity 22. Alternatively, the introduction of a sample or venting of air occurs through a gap in the two contact shelves located along the lengths of the contact shelves. The top piece 30 shown in FIG. 8 would be welded onto the bottom piece 10 shown in FIG. 7. The two pieces welded together are shown in FIG. 9. In the energy directors 14 on the outer edge of the side of bottom plastic piece 10 facing top plastic piece 30 have melted. The weld depth level is the height of the mesa of the second contact shelf 16. The interior cavity does not contain the material from the melted energy director and thus is of a known volume defined by the height of second contact shelf 16 and the width separating second contact shelf between the two inner walls of second contact shelf 16. The depth of this capillary can vary between 50 nanometers to 1 millimeter deep. In the preferred embodiment, the depth of the interior cavity 22 is 4 thousandth of an inch deep.

We claim:

1. An energy director structure with weld depth limitation feature for use on a first weldable piece which is to be ultrasonically welded to a second weldable piece, comprising:

a first contact shelf extending along a length of the first weldable piece;

a second contact shelf extending along the length of said first plastic piece and substantially parallel to the first contact shelf spaced apart from the first contact shelf by a groove extending along the length of the first weldable piece, wherein the first contact shelf has a first contact shelf height dimension, perpendicular to said length, narrowing along said first contact shelf height forming a ridge with a median first contact shelf width, perpendicular to said height, functioning as an energy director for ultrasonic welding energy; and wherein the second contact shelf has a second contact shelf height dimension, perpendicular to said length, and a second contact shelf width dimension, perpendicular to said height dimension, with said second contact shelf height dimension less than the first contact shelf height dimension and with the median second contact shelf width dimension at least equal to the median first contact shelf width dimension, thereby forming a mesa lacking an energy director, the second contact shelf height dimension functioning as a stop to limit the ultrasonic weld depth to within 3 microns of the height of the second contact shelf.

2. An energy director structure with weld depth limitation feature for use on a first plastic piece which is to be ultrasonically welded to a second plastic piece, comprising:

a first contact shelf extending along a length of the first plastic piece;

a second contact shelf extending along the length of said first plastic piece and substantially parallel to the first contact shelf spaced apart from the first contact shelf by a groove extending along the length of the first thermoplastic piece;

wherein the first contact shelf has a first contact shelf height dimension, perpendicular to said length, and a base width dimension that narrows at a break angle along said first contact shelf height forming an energy director for ultrasonic welding energy; and wherein the second contact shelf has a second contact shelf height dimension, perpendicular to said length, and a second contact shelf width dimension, perpendicular to said height dimension, with said second contact shelf height dimension less than the first contact shelf height dimension and with the median second contact shelf width dimension at least the first contact shelf base width dimension, thereby forming a mesa lacking an energy director, the second contact shelf height dimension functioning as a stop to limit the ultrasonic weld depth to within 3 microns of the height of the second contact shelf.

3. The energy director with weld depth limitation feature of claim 2 wherein the groove defines volume sufficient to contain a volume of melted thermoplastic material from the energy director on the first contact shelf.

4. The energy director with weld depth limitation feature of claim 2 wherein the shape of the energy director promotes the flow of melted thermoplastic material into the groove.

5. The energy director with weld depth limitation feature of claim 2 wherein the break angle of the energy director is lower than the height of the second contact shelf.

6. The energy director with weld depth limitation feature of claim 2 wherein the second contact shelf is at least twice as wide as the base width of the first contact shelf.

7. The energy director with weld depth limitation feature of claim 3 further comprising, a third contact shelf extending along a length of the first thermoplastic piece of material;

a fourth contact shelf extending along the length of the first thermoplastic piece of material and substantially parallel to the third contact shelf spaced apart from the first contact shelf by a second groove extending along the length of the first thermoplastic piece of material;

wherein said third contact shelf has a third contact shelf height dimension, perpendicular to said length, and a third contact shelf width dimension that narrows at a break angle along said third contact shelf height forming an energy director for ultrasonic welding energy; and wherein said fourth contact shelf has a fourth contact shelf height dimension, perpendicular to said length, and a fourth contact shelf width dimension, perpendicular to said height dimension, with said fourth contact shelf height dimension less than said third contact shelf height dimension and with the median fourth contact shelf width dimension at least the median first contact shelf base width dimension thereby forming a mesa, said fourth contact shelf height dimension limiting the ultrasonic weld depth to within 3 microns of the height of the second contact shelf.

8. The energy director with weld depth limitation feature of claim 7 wherein the shape of the energy director promotes the flow of melted thermoplastic material into the groove.

9. The energy director with weld depth limitation feature of claim 7 wherein the break angle of the energy director is lower than the height of the second contact shelf.

10. The energy director with weld depth limitation feature of claim 7 wherein the second contact shelf is at least twice as wide as the base width of the first contact shelf.

11. An ultrasonic weld seam process for holding together two plastic pieces comprising, providing a first plastic piece having on a first side a first contact shelf having a base of predetermined width in contact with a second plastic piece at the first contact shelf, said first contact shelf having an energy director to focus ultrasonic energy and further having a second contact shelf that is shorter than first contact shelf and wider than the base width of the first contact shelf such that the second contact shelf lacks an energy director, acts as a stop for weld depth and defines a groove separating the first and second shelves;

placing an ultrasonic horn against a side of the first plastic piece opposite the first side, such that said horn can provide ultrasonic weld energy to the energy director; and applying vibrations to the horn so as to weld together the first and second plastic pieces at a controlled depth which is within 3 microns of the height of the second contact shelf.

12. The weld seam process of claim 11 further defined by providing on the first plastic piece a groove of sufficient volume to contain melted material from the energy director.

13. The weld seam process of claim 12 further defined by shaving the first plastic piece to promote the flow of plastic material into the groove.

14. A welded seam process for making a capillary from first and second plastic pieces defining a capillary channel therebetween. comprising, providing on the first plastic piece on each of two parallel edge lengths an energy director structure with weld depth limitation feature having a parallel first and second contact shelf separated by a groove;

placing the first plastic piece against the second plastic piece in a mold in an orientation wherein the capillary channel is bound by the pieces;

placing an ultrasonic welding horn such that it can provide ultrasonic weld energy to the first plastic piece; and applying vibration to the horn so as to weld the first and second plastic pieces together.

* * * * *